United States Patent [19]

Le

[11] Patent Number: 5,258,696
[45] Date of Patent: Nov. 2, 1993

[54] IC CONTROLLER CHIP FOR BRUSHLESS DC MOTORS

[75] Inventor: Dong T. Le, Lakewood, Calif.

[73] Assignee: Allied-Signal Inc., Morris Township, N.J.

[21] Appl. No.: 893,864

[22] Filed: Jun. 5, 1992

[51] Int. Cl.[5] .................................. H02P 6/02
[52] U.S. Cl. ............................. 318/254; 318/138
[58] Field of Search ............... 318/138, 254, 439

[56] References Cited

U.S. PATENT DOCUMENTS

| | | | |
|---|---|---|---|
| 4,500,830 | 2/1985 | Gotou et al. | 323/267 |
| 4,510,422 | 4/1985 | Ogura | 318/254 |
| 4,977,356 | 12/1990 | Otani et al. | 318/138 |
| 5,017,845 | 5/1991 | Carobolante et al. | 318/138 |
| 5,119,000 | 6/1992 | Schultz | 318/254 |

OTHER PUBLICATIONS

Machine Design, "Selecting Brushless DC Motor Controllers", Aug. 11, 1988, pp. 109–114.

Motorola Semiconductors Handbook, 1988, for chip MC33034.

*Primary Examiner*—Bentsu Ro
*Attorney, Agent, or Firm*—Hugh P. Gortler; James W. McFarland; Robert A. Walsh

[57] ABSTRACT

An IC controller for a brushless motor includes commutation logic and an inverter on a single chip. The chip can also include an isolated power supply.

16 Claims, 8 Drawing Sheets

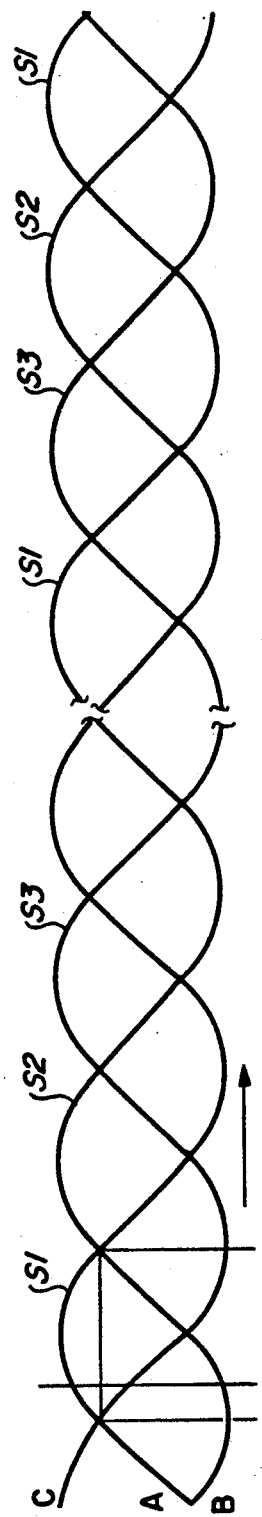
FIG. 3a
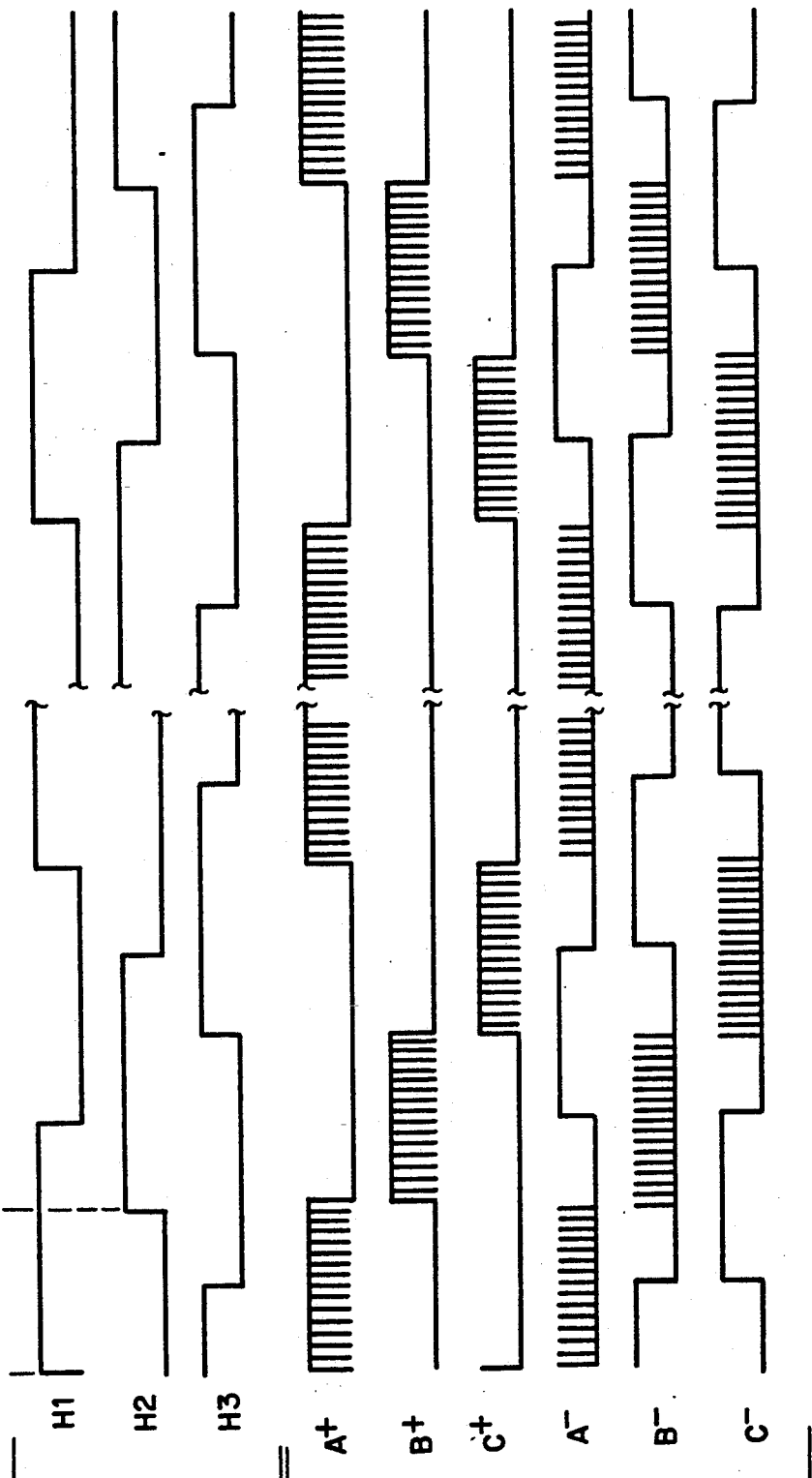
FIG. 3b
FIG. 3c

IC CONTROLLER CHIP FOR BRUSHLESS DC MOTORS

The invention described herein was made in the performance of work under NASA Contract No. NAS8-50000, and is subject to the provisions of Section 305 of the National Aeronautics and Space Act of 1958, as amended (42 U.S.C. 2457).

BACKGROUND OF THE INVENTION

This invention relates in general to controllers for electric motors and in particular to IC controller chips for brushless dc motors.

The rising popularity of brushless dc motors has brought a need for small, low-cost controllers. A typical motor controller includes four elements: rotor position sensors which provide signals indicating the position of the motor's rotor with respect to its stator windings; commutation logic which generates commutation commands in response to the rotor position signals; a power supply; and an inverter containing power transistors, either bipolar or field-effect, which commutate power to the motor' stator windings in response to the commutation commands.

The commutation logic can be fabricated on a single integrated circuit (IC) chip, and the power supply and inverter are implemented with discrete analog components. The resulting controller is a marriage of an analog element (the inverter), a digital element (the IC chip) and a power supply.

SUMMARY OF THE INVENTION

According to the present invention, the commutation logic inverter and are fabricated on a single IC chip. An isolated power supply also can be fabricated on the chip.

BRIEF DESCRIPTION OF THE DRAWINGS

FIGS. 3a-3c depict rotor position signals and the commutation commands derived therefrom;

DETAILED DESCRIPTION OF THE PREFERRED EMBODIMENT

Figure 1:
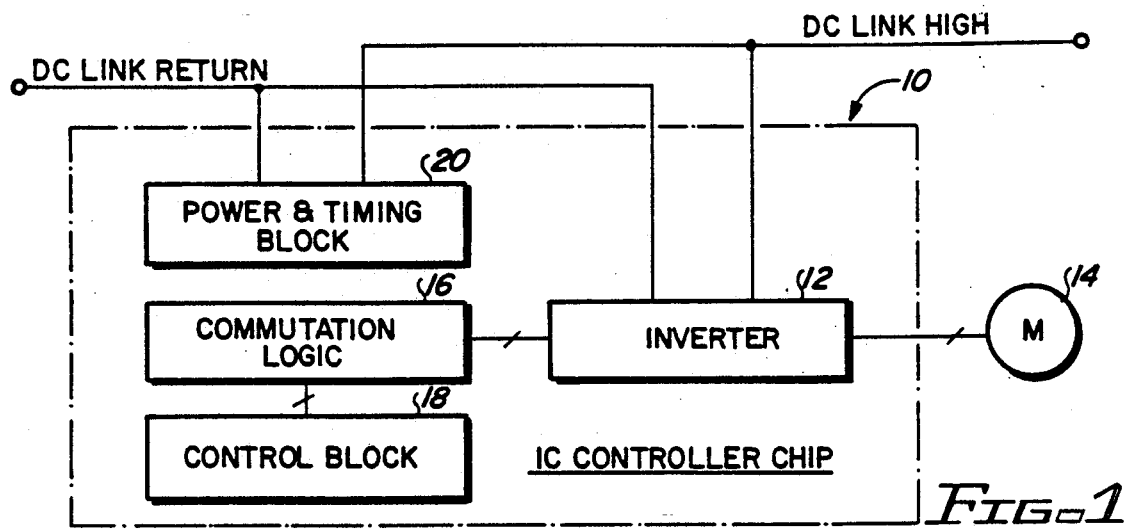
FIG. 1 is a block diagram of a brushless motor and an IC controller chip according to the present invention.

FIG. 1 shows an IC controller chip 10 for a brushless dc motor 14. The chip 10 includes an inverter 12, commutation logic 16, and a power and timing block 20 which provides an isolated power supply. A DC link supplies power to the inverter 12 and power block 20. The commutation logic 16 operates the motor 14 in either two quadrants or four quadrants. In two quadrant operation, the motor is driven in either the clockwise or counterclockwise direction. To drive the motor 14, the commutation logic 16 commands the inverter 12 to put energy into the motor's stator windings. In four quadrant operation, the motor 14 is also braked in either the clockwise or counterclockwise direction. To brake the motor 14, the commutation logic 16 commands the inverter 12 to remove energy (i.e., back emf) from the motor's stator windings.

The chip 10 also includes a control block 18 which performs functions such as controlling motor speed and providing current feedback. For two quadrant operation, the control block 18 closes the loop on current. For four quadrant operation, the current loop is closed by a microprocessor and/or discrete components that are connected to the chip 10. Other functions performed by the control block 18 include protecting against shoot-through in the inverter 12 and fault-monitoring for position sensor failure and motor overcurrent.

Figure 2:
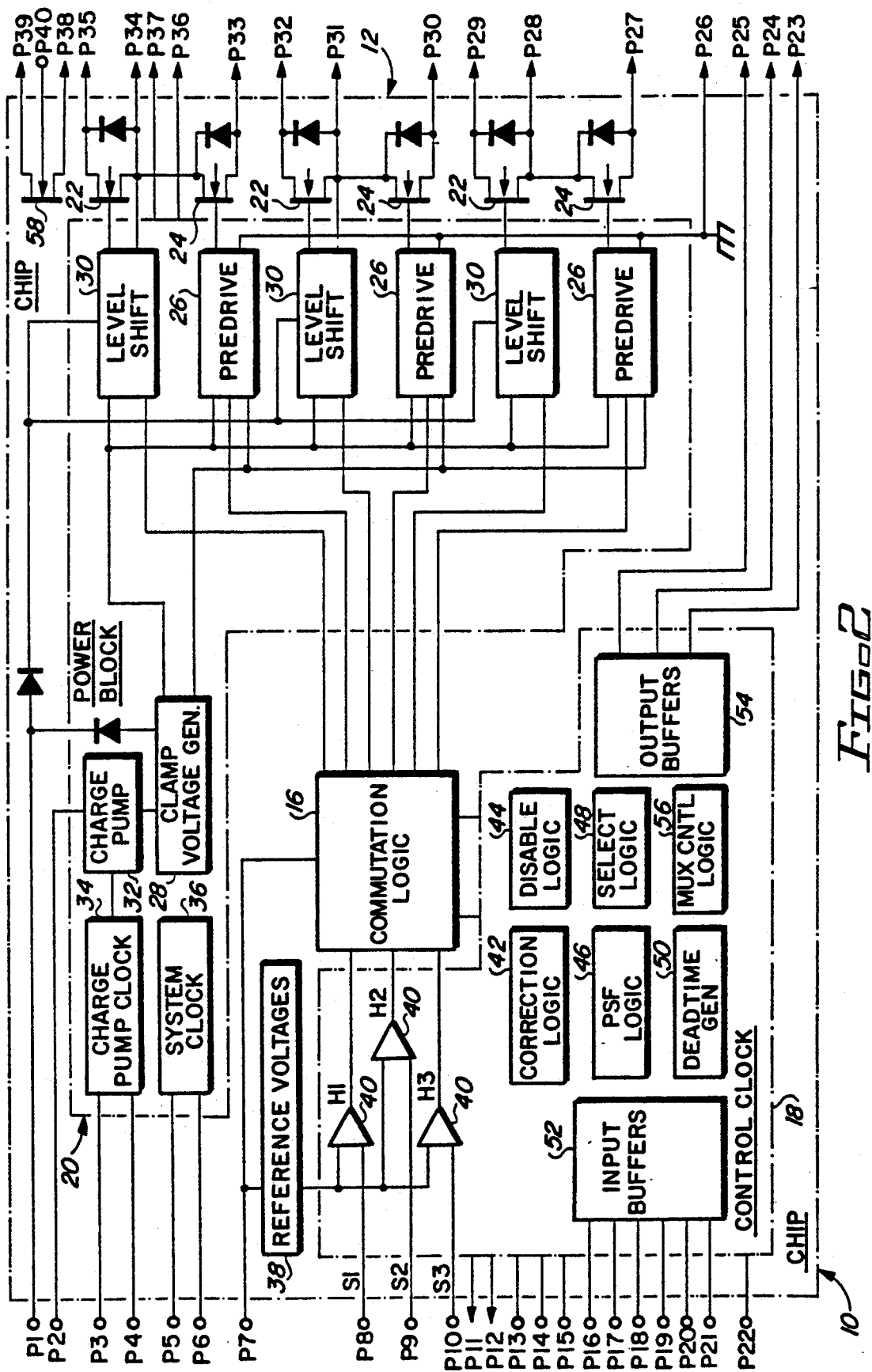
FIG. 2 is a detailed block diagram of the IC controller chip shown in FIG. 1.

FIG. 2 shows the chip 10 configured for a brushless dc motor having three phase windings A, B and C connected in a wye configuration. The chip 10 can be configured for a motor having any number of phase windings; however, this three phase configuration is most common.

The inverter 12 includes three upper power FETS 22 and three lower power FETS 24, each of which operates as a switch. The upper power FETS 22 are N-channel devices and the lower power FETS 24 are P-channel devices. Pins P35, P32 and P29 of the chip 10 allow a DC link high to be coupled to the drains of each upper power FET 22. Pins P34, P31 and P28 of the chip 10 allow the sources of the upper power FETS 22 and the drains of the lower power FETS 24 to be connected to their respective phase windings A, B and C. The sources of the lower power FETS 24 are not connected directly to the DC link return. Instead, pins P33, P30 and P27 allow the sources of the lower power FETS 24 to be coupled to the DC link return in a manner which depends upon the required current feedback. Diodes 25 are placed across the controlled current paths of the power FETS 22 and 24 to prevent damage from overcurrents.

The commutation logic 16 provides the commutation commands A+, A−, B+, B−, C+ and C− which turn "on" and "off" the power FETS 22 and 24 in the inverter 12, allowing power to be commutated to the selected phase windings A, B and C of the motor 14. Commutation commands A+, B+ and C+ are supplied to respective gates of the three upper power FETS 22, and commutation commands A−, B− and C− are supplied to respective gates of the three lower power FETS 24.

For two quadrant operation, the commutation commands A+, A−, B+, B−, C+ and C− are derived from five inputs: rotor position signals H1, H2 and H3; a direction command DIRCMD; and an error signal REF1. The rotor position signals H1, H2 and H3 are decoded in a well known manner to select the windings that are to be energized (see FIGS. 3b and 3c). The windings A, B and C are energized only when the error signal REF1 is high. Thus, motor current (and speed) can be controlled by controlling the "on" time indicated by the error signal REF1. The direction command DIRCMD indicates the commanded direction of motor rotation. When high, the direction command DIRCMD commands the motor 14 to rotate in a clockwise direction; when low, it commands the motor 14 to rotate in a counterclockwise direction. Table is a truth table for the commutation commands A+, A−, B+, B−, C+ and C−. State X indicates either high or low, and state V indicates all combinations of the rotor position signals H1, H2 and H3.

TABLE 1

| REF1 | DIRCMD | H1 | H2 | H3 | A+ | B+ | C+ | A− | B− | C− |
|---|---|---|---|---|---|---|---|---|---|---|
| 1 | 1 | 0 | 0 | 0 | 0 | 0 | 0 | 0 | 0 | 0 |
| 1 | 1 | 0 | 0 | 1 | 0 | 0 | 1 | 0 | 1 | 0 |
| 1 | 1 | 0 | 1 | 0 | 0 | 1 | 0 | 1 | 0 | 0 |
| 1 | 1 | 0 | 1 | 1 | 0 | 1 | 0 | 1 | 0 | 0 |
| 1 | 1 | 1 | 0 | 0 | 1 | 0 | 0 | 0 | 0 | 1 |
| 1 | 1 | 1 | 0 | 1 | 0 | 0 | 0 | 0 | 1 | 0 |
| 1 | 1 | 1 | 1 | 0 | 0 | 1 | 0 | 0 | 0 | 1 |
| 1 | 1 | 1 | 1 | 1 | 0 | 0 | 0 | 0 | 0 | 0 |
| 1 | 0 | 0 | 0 | 0 | 0 | 0 | 0 | 0 | 0 | 0 |
| 1 | 0 | 0 | 0 | 1 | 0 | 1 | 0 | 0 | 0 | 1 |
| 1 | 0 | 0 | 1 | 0 | 1 | 0 | 0 | 0 | 1 | 0 |
| 1 | 0 | 0 | 1 | 1 | 0 | 0 | 0 | 0 | 0 | 1 |
| 1 | 0 | 1 | 0 | 0 | 0 | 0 | 1 | 1 | 0 | 0 |
| 1 | 0 | 1 | 0 | 1 | 0 | 1 | 0 | 1 | 0 | 0 |
| 1 | 0 | 1 | 1 | 0 | 0 | 0 | 1 | 0 | 1 | 0 |
| 1 | 0 | 1 | 1 | 1 | 0 | 0 | 0 | 0 | 0 | 0 |
| 0 | X | V | V | V | 0 | 0 | 0 | 0 | 0 | 0 | the motor 14 to be removed from the stator windings A, B and C. Table 2 is a truth table of the commutation commands A+, A−, B+, B−, C+ and C− when motor rotation is commanded in a clockwise direction (DIR=1), and Table 3 is a truth table of the commutation commands A+, A−, B+, B−, C+ and C− when motor rotation is commanded in a counterclockwise direction (DIR=0).

TABLE 2

| DIR | DC | DCINV | H1 | H2 | H3 | A+ | B+ | C+ | A− | B− | C− |
|---|---|---|---|---|---|---|---|---|---|---|---|
| 1 | 0 | 0 | V | V | V | 0 | 0 | 0 | 0 | 0 | 0 |
| 1 | 1 | 0 | 0 | 0 | 0 | 0 | 0 | 0 | 0 | 0 | 0 |
| 1 | 1 | 0 | 0 | 0 | 1 | 0 | 0 | 1 | 0 | 1 | 0 |
| 1 | 1 | 0 | 0 | 1 | 0 | 0 | 1 | 0 | 1 | 0 | 0 |
| 1 | 1 | 0 | 0 | 1 | 1 | 0 | 0 | 1 | 1 | 0 | 0 |
| 1 | 1 | 0 | 1 | 0 | 0 | 1 | 0 | 0 | 0 | 0 | 1 |
| 1 | 1 | 0 | 1 | 0 | 1 | 1 | 0 | 0 | 0 | 1 | 0 |
| 1 | 1 | 0 | 1 | 1 | 0 | 0 | 1 | 0 | 0 | 0 | 1 |
| 1 | 1 | 0 | 1 | 1 | 1 | 0 | 0 | 0 | 0 | 0 | 0 |
| 1 | 0 | 1 | 0 | 0 | 0 | 0 | 0 | 0 | 0 | 0 | 0 |
| 1 | 0 | 1 | 0 | 0 | 1 | 0 | 0 | 0 | 0 | 1 | 1 |
| 1 | 0 | 1 | 0 | 1 | 0 | 0 | 0 | 0 | 1 | 1 | 0 |
| 1 | 0 | 1 | 0 | 1 | 1 | 0 | 0 | 0 | 1 | 0 | 1 |
| 1 | 0 | 1 | 1 | 0 | 0 | 0 | 0 | 0 | 1 | 0 | 1 |
| 1 | 0 | 1 | 1 | 0 | 1 | 0 | 0 | 0 | 1 | 1 | 0 |
| 1 | 0 | 1 | 1 | 1 | 0 | 0 | 0 | 0 | 0 | 1 | 1 |
| 1 | 0 | 1 | 1 | 1 | 1 | 0 | 0 | 0 | 0 | 0 | 0 |
| 1 | 1 | 1 | V | V | V | 0 | 0 | 0 | 0 | 0 | 0 |

Figure 4A:
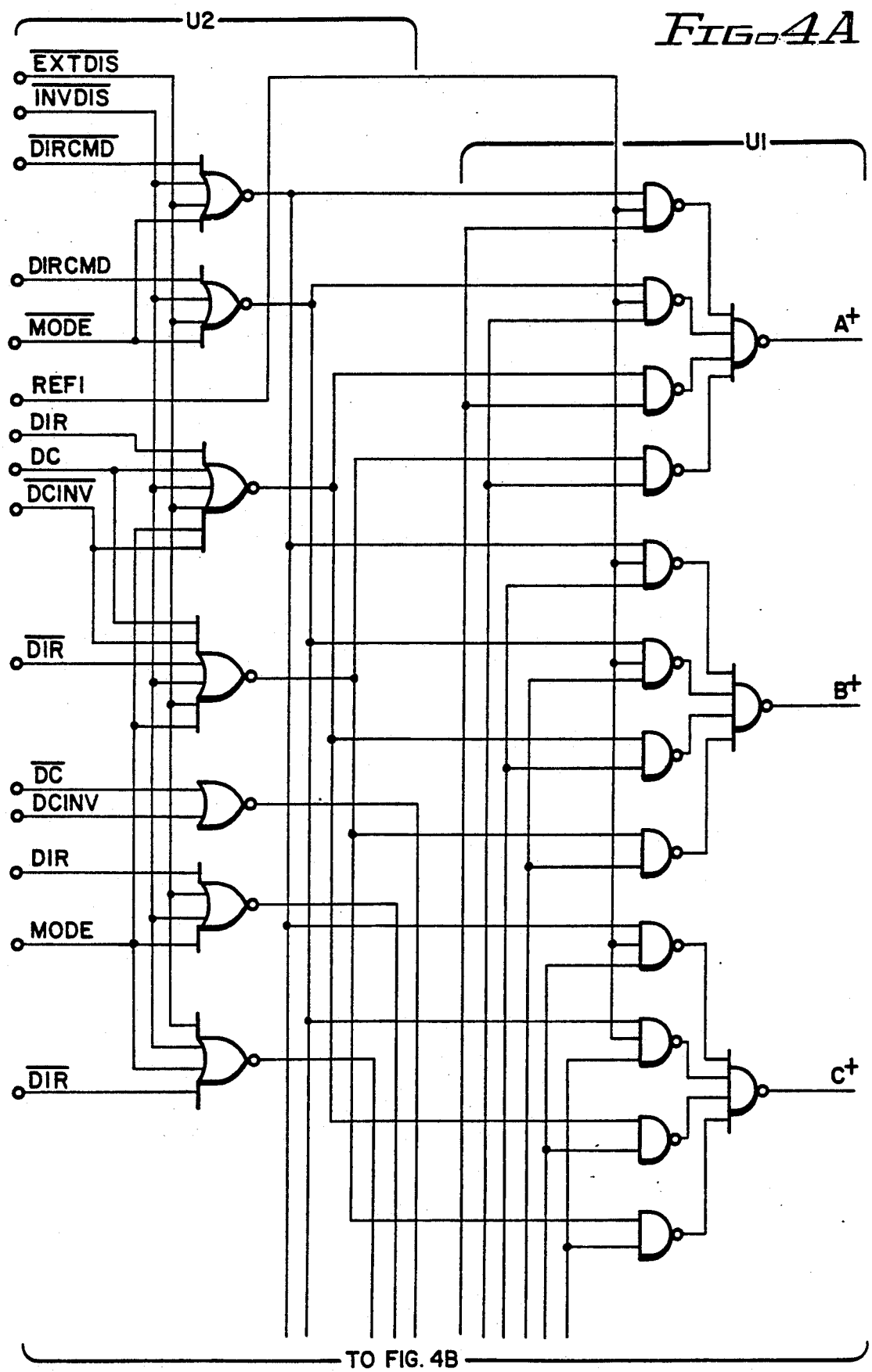
FIG. 4 (including 4A and 4B) is a diagram of logic for generating commutation commands.
Figure 4B:
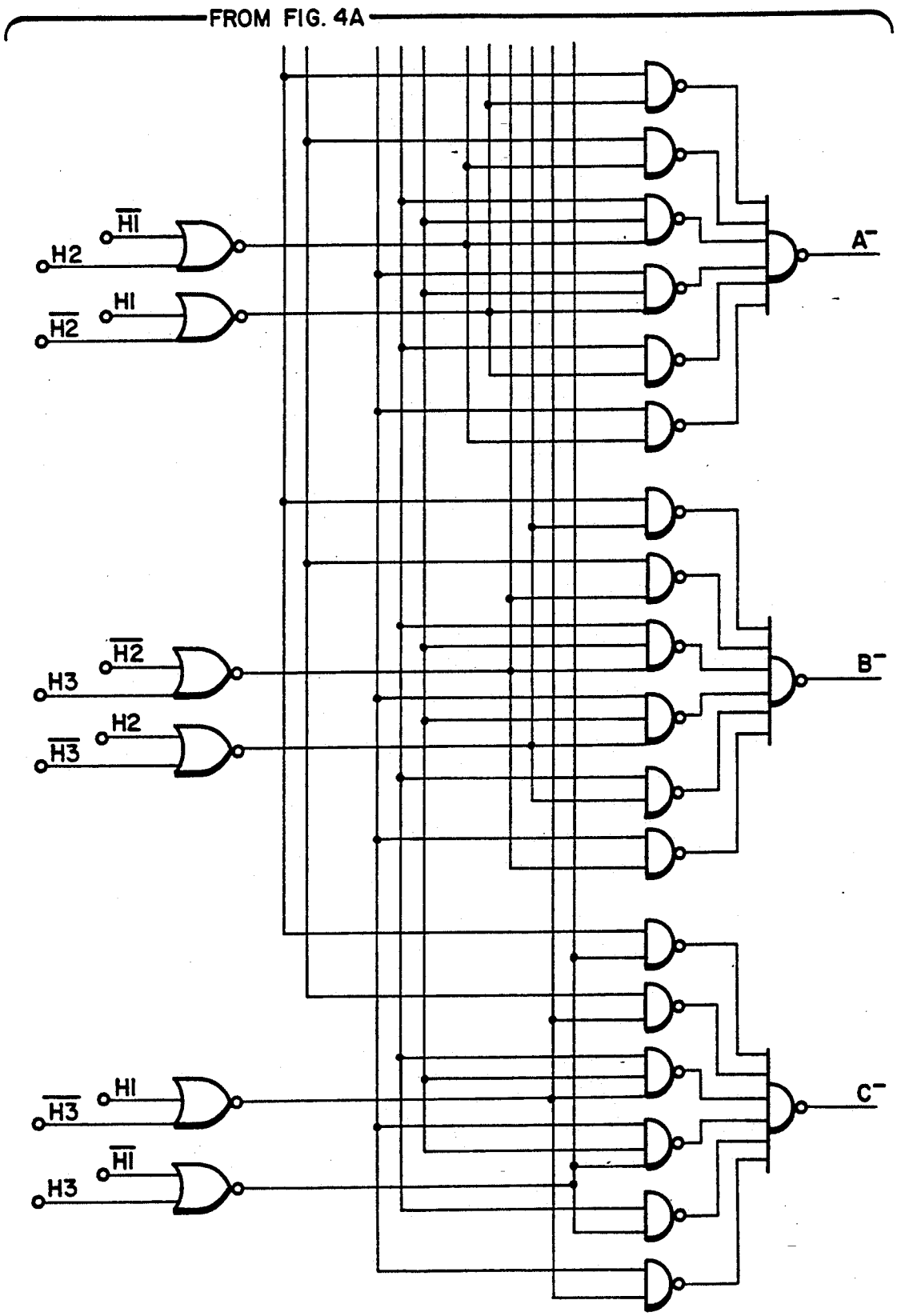

For four quadrant operation, the commutation commands A+, A−, B+, B−, C+ and C− are derived from six inputs: the rotor position signals H1, H2 and H3; a direction command DIR which is derived from direction command DIRCMD; and duty cycle commands DC and DCINV. Whenever the duty cycle commands DC and DCINV are at the same state, either high or low, the commutation commands A+, A−, B+, B−, C+ and C− turn off all the FETS. Thus, power is not supplied to the motor 14. Whenever the duty cycle command DC is high and the duty cycle command DCINV is low, the motor 14 is driven in the commanded direction. And, whenever the duty cycle command DC is low and the duty cycle command DCINV is high, the motor 14 is braked in the commanded direction, allowing the back emf generated by The inverter 12 can be shut down by an externally-generated disable signal EXTDIS which is supplied to the commutation logic 16 by pin P18. The inverter 12 can also be shut down by a disable signal INVDIS which is generated by the control block 18. The disable signal INVDIS shuts down the inverter 12 in the event that the position sensors fail or a motor overcurrent occurs. The commutation logic 16 can realize the truth tables of Tables 1-3 and utilize the disable signals EXTDIS and INVDIS with the equivalent of 36 NAND gates U1 and 13 NOR gates U2 (see FIG. 4).

The power block 20 isolates the upper and lower power FETS 22 and 24 from the commutation logic 16. Three predrive stages 26 interface the commutation commands A−, B− and C− to the lower power FETS 24. These stages 26 provide sufficient gate drive voltage and current to the lower power FETS 24. To prevent damage to the gate oxide on the lower power FETS 24, the outputs of the predrive stages 26 are clamped by a clamp voltage generator 28 consisting of a string of FETS and diodes. The predrive stages 26 also provide sufficient gate drive for large, external power FETS which are associated with a hybrid mode of operation (see FIG. 15).

comparators 40 furnish the position signals H1, H2 and H3 (FIG. 3b).

TABLE 3

| DIR | DC | DCINV | H1 | H2 | H3 | A+ | B+ | C+ | A− | B− | C− |
|---|---|---|---|---|---|---|---|---|---|---|---|
| 0 | 0 | 0 | V | V | V | 0 | 0 | 0 | 0 | 0 | 0 |
| 0 | 1 | 0 | 0 | 0 | 0 | 0 | 0 | 0 | 0 | 0 | 0 |
| 0 | 1 | 0 | 0 | 0 | 1 | 0 | 1 | 0 | 0 | 0 | 1 |
| 0 | 1 | 0 | 0 | 1 | 0 | 1 | 0 | 0 | 0 | 1 | 0 |
| 0 | 1 | 0 | 0 | 1 | 1 | 1 | 0 | 0 | 0 | 0 | 1 |
| 0 | 1 | 0 | 1 | 0 | 0 | 0 | 0 | 1 | 1 | 0 | 0 |
| 0 | 1 | 0 | 1 | 0 | 1 | 0 | 1 | 0 | 1 | 0 | 0 |
| 0 | 1 | 0 | 1 | 1 | 0 | 0 | 0 | 1 | 0 | 1 | 0 |
| 0 | 1 | 0 | 1 | 1 | 1 | 0 | 0 | 0 | 0 | 0 | 0 |
| 0 | 0 | 1 | 0 | 0 | 0 | 0 | 0 | 0 | 0 | 0 | 0 |
| 0 | 0 | 1 | 0 | 0 | 1 | 0 | 0 | 0 | 0 | 1 | 1 |
| 0 | 0 | 1 | 0 | 1 | 0 | 0 | 0 | 0 | 1 | 1 | 0 |
| 0 | 0 | 1 | 0 | 1 | 1 | 0 | 0 | 0 | 1 | 0 | 1 |
| 0 | 0 | 1 | 1 | 0 | 0 | 0 | 0 | 0 | 1 | 0 | 1 |
| 0 | 0 | 1 | 1 | 0 | 1 | 0 | 0 | 0 | 1 | 1 | 0 |
| 0 | 0 | 1 | 1 | 1 | 0 | 0 | 0 | 0 | 0 | 1 | 1 |
| 0 | 0 | 1 | 1 | 1 | 1 | 0 | 0 | 0 | 0 | 0 | 0 |
| 0 | 1 | 1 | V | V | V | 0 | 0 | 0 | 0 | 0 | 0 |

Three predrive level-shifter stages 30 interface the commutation commands A+, B+ and C+ to their respective upper power FETS 22. These stages 30 are similar to the predrive stages 26, except that they are designed to drive the upper power FETS 22 of the push-pull pairs; thus the ground returns are referenced to the sources of the upper power FETS 22.

For each upper power FET 22 to be turned on, its gate must be boosted to a voltage that is between 5 and 15 vdc above its source. The boost voltage can be supplied to the inverter 12 by an external source via pin P1. Alternatively, the boost voltage can be supplied by a charge pump 32 through the clamp voltage generator 28. The charge pump 32 has one input that is provided with the DC link voltage on pin P37 and another input that is supplied with a signal whose frequency establishes the amount of voltage boost. This signal can be supplied externally via pin P2, or it can be supplied internally by a charge pump clock 34. The charge pump clock 34 includes a sawtooth oscillator whose frequency is set by a resistor coupled between pins P3 and P4 and a capacitor coupled between pin P4 and ground.

A system clock 36 synchronizes all operations on the chip 10. The system clock 36 includes a sawtooth oscillator whose frequency is adjustable between 500 kHz to 1 MHz. This band width is limited by the switching frequency of the power FETS 22 and 24. The oscillator frequency is set by a resistor coupled between pins P5 and P6 and a capacitor coupled between pin P6 and ground.

A reference voltage supply 38 provides accurate reference voltages to the commutation logic 16 and control block 18. Operating potential is supplied to the reference voltage supply 38 by pin P7. The reference voltage is brought outside the chip 10 on pin P11 for external reference or for use as an external power supply, thereby eliminating the need for an external reference voltage supply.

The control block 18 provides the position signals H1, H2 and H3 to the commutation logic 16. These signals H1, H2 and H3 are derived from three rotor position signals S1, S2 and S3, either square or sinusoidal, that are out-of-phase by 120° (FIG. 3a). The signals S1, S2 and S3 are supplied to pins P8, P9 and P10 of the chip 10 and then are squared off by three comparators 40, which are referenced to zero volts. Outputs of the comparators 40 furnish the position signals H1, H2 and H3 (FIG. 3b).

The control block 18 includes direction logic 42 which supplies the direction command DIRCMD to the commutation logic 16. Generated externally, the direction command DIRCMD is supplied to the direction logic by pin P16.

Figure 5:
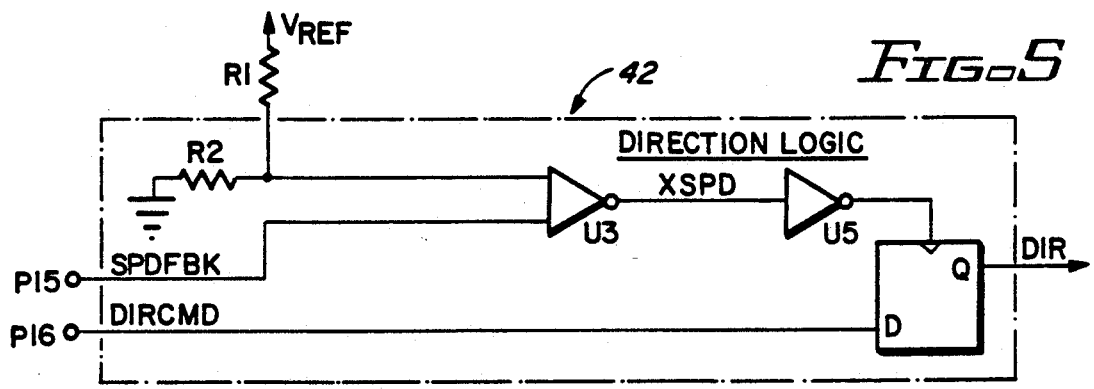
FIG. 5 is a diagram of logic for generating motor direction commands.

The direction logic 42 also supplies the direction command DIR to the commutation logic 16. The direction command DIR is based upon the present and previous direction commands DIRCMD and DIRCMDB, and upon the difference between a speed feedback signal SPDFBK on pin P15 and a threshold speed, such as 10% of the motor's maximum rated speed. If motor speed is below the threshold, the direction command DIR tracks the direction command DIRCMD. If, however, the motor speed is above the threshold when the direction command DIRCMD is changed, the direction command DIR will not change states. Thus, the motor 14 will not change directions if it is running too fast. This safeguard prevents motor damage caused by a sudden change in direction due to factors such as noise and human error. Table 4 shows the truth table for the direction logic 42, which can be realized by the equivalent of a comparator U3, latch U4 and an inverter U5 (see FIG. 5). The speed threshold is provided by the reference voltage supply 38 and voltage dividers R1 and R2.

TABLE 4

| DIRCMD | DIRCMDB | XSPD | DIR |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 1 |
| 1 | 0 | 1 | 0 |
| 1 | 1 | 0 | 1 |
| 1 | 1 | 1 | 1 |

Figure 6:
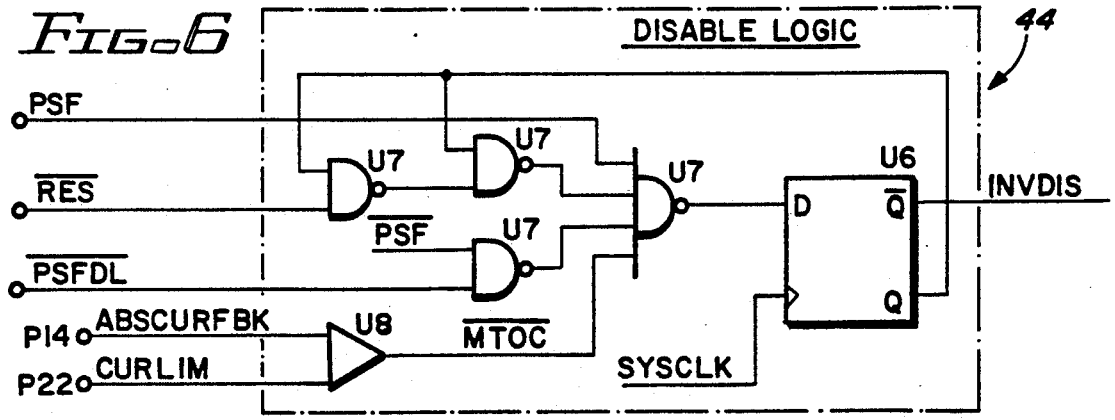
FIG. 6 is a diagram of logic for generating an inverter disable signal.

The control block 18 also includes disable logic 44 which issues the disable signal INVDIS when either motor overcurrent or position sensor failure occurs. After being disabled by the signal INVDIS, the inverter 12 remains disabled until a reset signal RESET is applied to pin P19. The disable logic 48 can be realized by the equivalent of a latch U6 and four NAND gates U7 (see FIG. 6). Signal MTOC indicates motor overcurrent, and signals PSF and PSFDL indicate position sensor failure.

The signal MTOC indicating motor overcurrent is generated by an on-chip comparator U8 (see FIG. 6) that takes the difference between a signal ABSCURFBK indicating motor current feedback and a signal CURLIM indicating maximum current limit. The feedback signal ABSCURFBK is supplied to the control block 18 by pin P14 and the limit signal CURLIM is supplied on pin P22. This limit signal CURLIM is made adjustable to allow the chip 10 to shut down at different current levels. The motor overcurrent protection can be disabled by tying pin P22 to ground.

Figure 7:
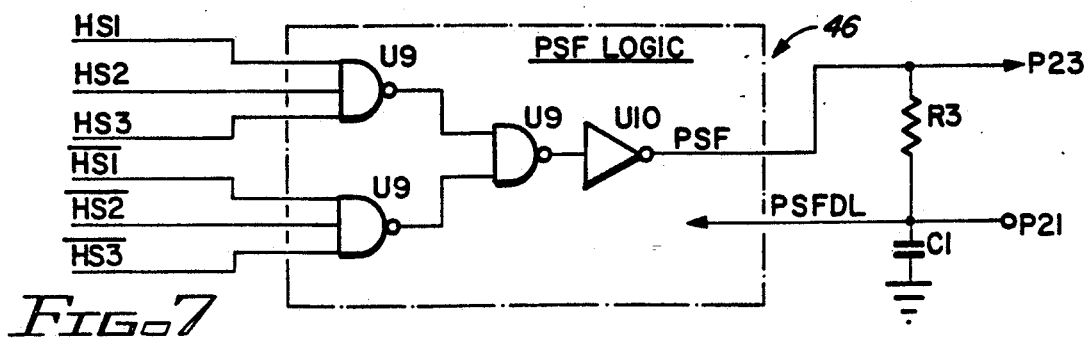
FIG. 7 is a diagram of logic for detecting position sensor failure.

The signal PSF indicating position sensor failure is generated by PSF logic 46. Such failure occurs when all three position signals H1, H2 and H3 go high simultaneously, or when they go low simultaneously. The PSF logic 46 can be realized by the equivalent of three NAND gates U9 and an inverter U10 (see FIG. 7). The signal PSF is monitored on pin P23. To account for noise that might be on the position sensor signals H1, H2 and H3, the signal PSF on pin P23 is delayed by an interval and fed back into the chip on pin P21. The interval of delay is determined by an off-chip resistor R3 coupled between pins P21 and P23 and a capacitor C1 coupled between pins P23 and ground (see FIG. 7). This delayed signal PSFDL prevents the disable logic 44 from disabling the inverter 12 due to transients. The PSF logic 46 can be disabled by tying pin P21 to ground.

Figure 8:
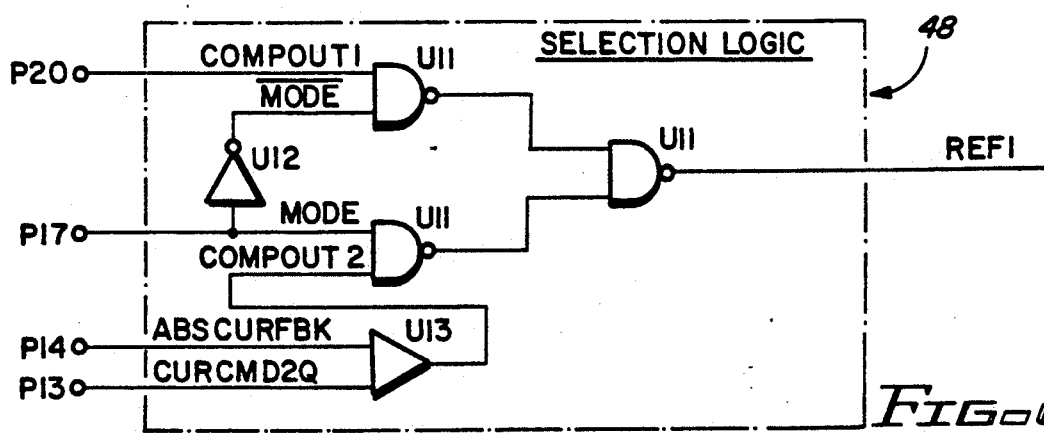
FIG. 8 is a diagram of logic for selecting an error signal.

The control block 18 includes selection logic 48 which supplies the error signal REF1 to the commutation logic 16. The error signal REF1 is selected from either error signal COMPOUT1 for four quadrant operation or from error signal COMPOUT2 for two quadrant operation. Error signal COMPOUT1 is applied to pin P20. Error signal COMPOUT2 is generated by the selection logic 48; it takes the difference between the current feedback signal ABSCURFBK and a current command CURCMD2Q, which is generated off the chip 10 and applied to pin P13. The selection logic 48 makes its selection according to a command MODE indicating mode of operation, which command is supplied to the chip 10 by pin P17. The selection logic 48 can be realized by the equivalent of three NAND gates U11, an inverter U12 and an operational amplifier U13 (see FIG. 8).

The control block 18 also generates the duty cycle commands DC and DCINV. When the motor 14 is being driven, only one of the upper power FETS 22 is "on" at any particular time. When the gate voltage is removed, this power FET 22 should be turned off. However, the power FET 22 has an inherent capacitance; therefore, it continues to conduct until discharged. If, during braking, the complimentary lower power FET 24 is turned on while this upper power FET 22 is being discharged, a short across the power supply will occur. This occurrence, known as shoot-through, can damage the power supply.

Figure 9:
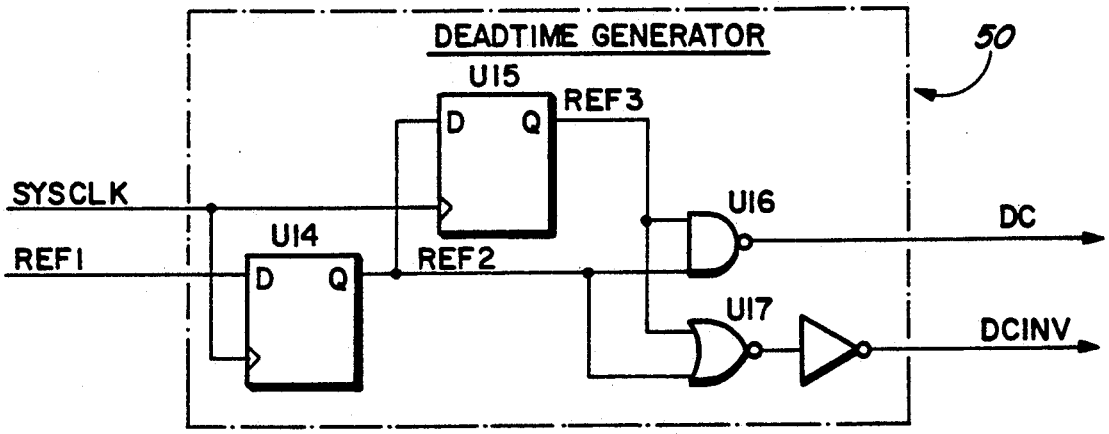
FIG. 9 is a logic diagram of a deadtime generator.
Figure 10:
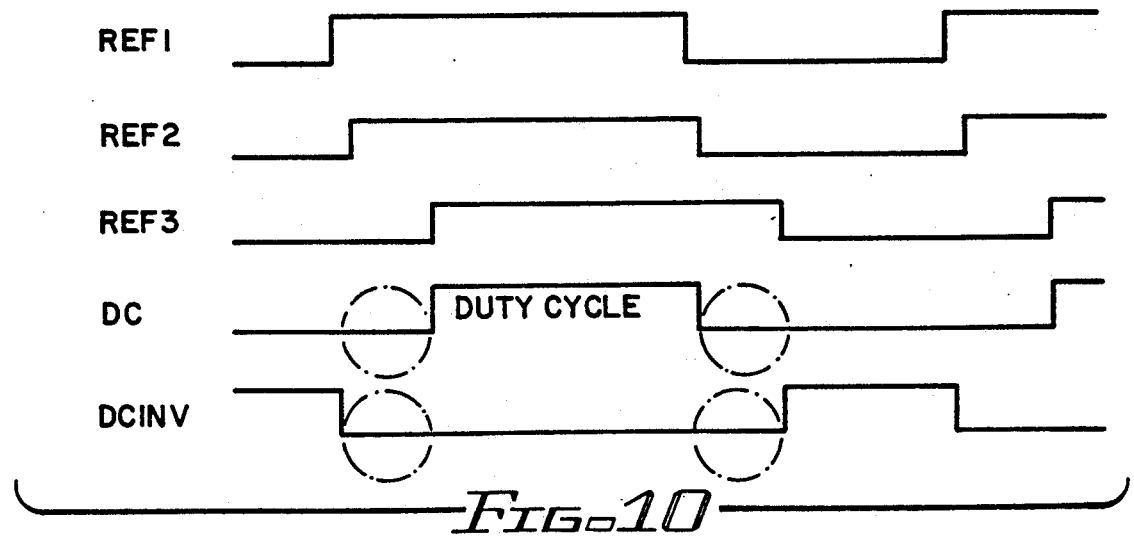
FIG. 10 depicts signals generated by the deadtime generator.

The control block 18 includes a deadtime generator 50 which prevents shoot-through by reducing the "on"-time of the error signal REFI, thereby ensuring that the lower power FET 24 remains "off" while the base charge from the complimentary upper power FET 22 is being removed. As shown in FIG. 9, the error signal REFI is clocked into a first latch U14 on the leading edge of a clock pulse SYSCLK from the system clock 36. The first latch U14 synchronizes the error signal REFI with the system clock 36. An output signal REF2 from the first latch U14 is clocked into a second latch U15, delaying the output signal REF2 by one clock pulse. Output signals REF2 and REF3 from the first and second latches U14 and U15 are NAND'ed together by a NAND gate U16, whose output provides the duty cycle command DC. The output signals REF2 and REF3 are also NOR'ed together by a NOR gate U17, whose output provides the duty cycle command DCINV. As seen from the timing diagram of FIG. 10, the generator 50 creates a deadtime between the duty cycle commands DC and DCINV, allowing the upper power FET 22 to discharge before the complimentary lower power FET 24 is turned on and vice versa. The deadtime is proportional to the clock period of the system clock 36. Although the duty cycle command DC is delayed by one clock cycle, this delay is insignificant because of the high clock speeds (e.g., 1 MHz) involved.

The control block 18 includes input buffers 52 for buffering the signals on pins P16-P21 and output buffers 54 for buffering the signals on pins P23. The buffers 52 and 54 are clocked to the system clock 36.

Figure 11:
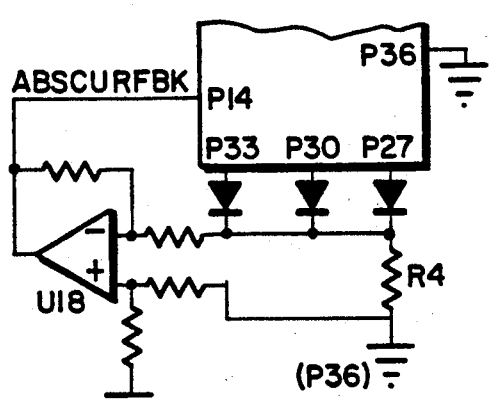
FIGS. 11 and 12 are schematic diagrams of the chip configured with current feedback components for two and four quadrant operation.

FIG. 11 shows the chip 10 being configured for current feedback in two quadrant operation. In this mode, only the magnitude of the feedback current need be known. An off-chip resistor R4 is coupled between pin P36 (the DC link return) and pins P33, P30 and P27 (the low sides of the three lower power FETS 24). When any two windings are energized, current flows through the resistor R4. The resulting voltage drop across the resistor R4 is amplified by an off-chip operational amplifier U18, whose output provides the signal ABSCURFBK indicating absolute current feedback. This signal ABSCURFBK is supplied to pin P14 of the chip 10. The current command CURCMD2Q, which is applied to pin P13, can be generated by an off-chip component such as a microprocessor or a potentiometer. Given the current feedback signal ABSCUFBK and the current command CURCMD2Q, the control block 18 can close the loop on current for two quadrant operation.

Figure 12:
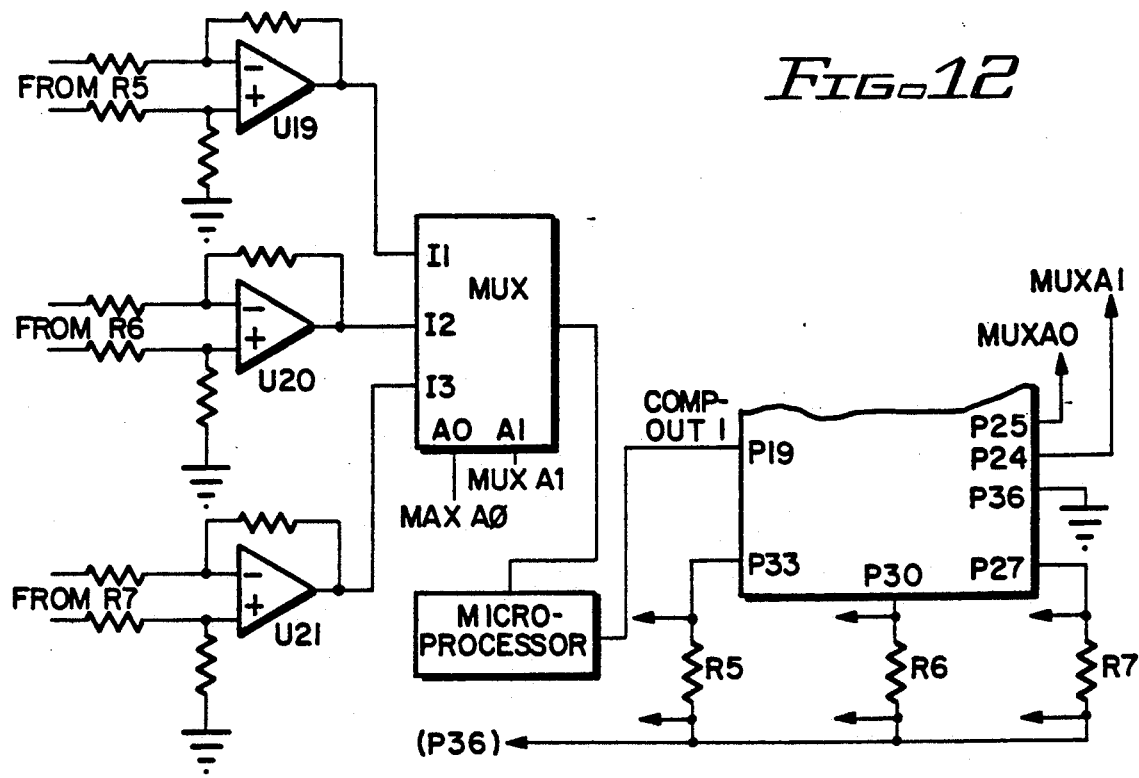
Figure 13:
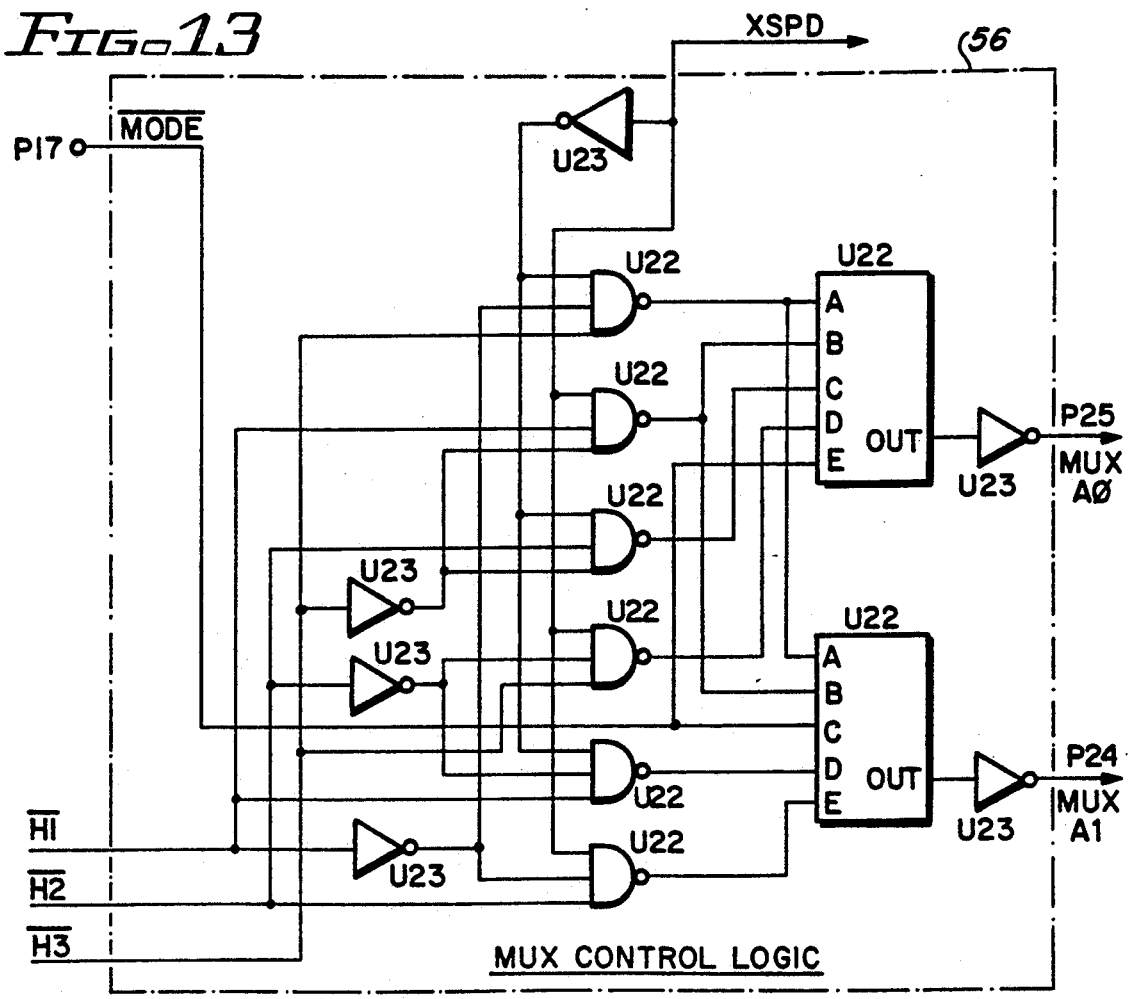
FIG. 13 is a diagram of logic for generating multiplexer control signals.

FIG. 12 shows the chip 10 being configured for current feedback in four quadrant operation. Three resistors R5, R6 and R7 are required to determine current feedback when the motor 14 is being braked. The three resistors R5, R6 and R7 are coupled between pin P36 (the DC link return) and pins P33, P30 and P27, respectively (the sources of the three lower power FETS 24). Voltage drops across the resistors are amplified by three operational amplifiers U19, U20 and U21, whose respective outputs are supplied to inputs of a multiplexer MUX. The multiplexer MUX selects the feedback current from the winding through which current is flowing. The selection is controlled by signals M0 and M1, which are supplied by MUX control logic 56 in the control block 18 (see FIG. 2). Generated according to direction command DIR and the position signals H1, H2 and H3, these signals M0 and M1 are buffered and supplied on pins P24 and P25. Table 5 shows the truth table for MUX control logic 56, which can be realized by the equivalent of eight NAND gates U22 and six inverters U23 (see FIG. 13).

TABLE 5

| H1 | H2 | H3 | DIR | M0 | M1 |
|----|----|----|-----|----|----|
| 1  | 1  | 1  | 1   | 1  | 0  |
| 0  | 1  | 1  | 1   | 0  | 1  |
| X  | 1  | 1  | 0   | 1  | 0  |
| X  | 1  | 0  | 1   | 1  | 1  |

TABLE 5-continued

| H1 | H2 | H3 | DIR | M0 | M1 |
|----|----|----|-----|----|----|
| X | 1 | 0 | 0 | 0 | 0 |
| X | 0 | 1 | 1 | 0 | 1 |
| X | 0 | 1 | 0 | 1 | 0 |
| X | 0 | 0 | 1 | 1 | 1 |
| X | 0 | 0 | 0 | 0 | 0 |

To close the loop on current for four quadrant operation, a closed loop control must be coupled to the chip 10. The closed loop control receives a current feedback signal from the multiplexer MUX and generates the error signal COMPOUT1 which is applied to pin P19 of the chip 10. Such a closed loop control can be implemented through discrete elements or through a microprocessor in a manner that is well known to those skilled in the art.

Figure 14:
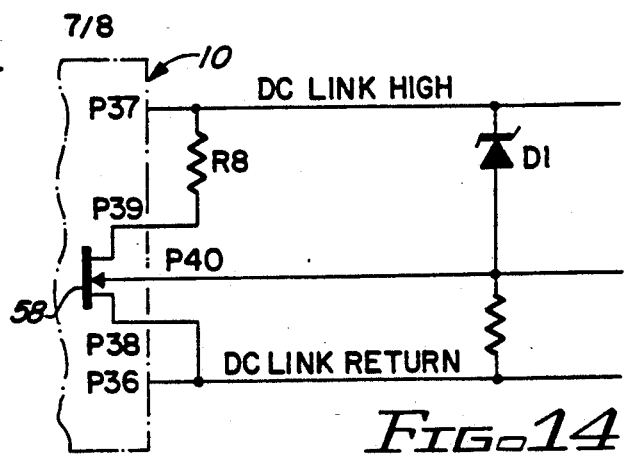
FIG. 14 is a diagram of logic for an aiding load resistor.

FIG. 14 shows the chip 10 being coupled to an aiding load resistor R8. Normally, when the inverter 12 brakes the motor 14, energy is dumped back into the power supply. If the dumped energy becomes excessive, however, it can damage the power supply. To prevent such damage, the aiding load resistor R8 dissipates the energy that exceeds a threshold. The aiding load resistor R8 is coupled between pins P37 (the DC link high) and P39 (the drain of an on-chip FET 58). The source of the FET 58 is coupled to the DC link return by connecting pin P38 to pin P36. The threshold is established by an off-chip zener diode D1. When the back emf on the DC link high exceeds the breakdown voltage of the zener diode D1, a signal is supplied to the gate of the FET 58 through pin P40. This signal causes the FET 58 to connect the aiding load resistor R8 between the DC link high and the DC link return, allowing the aiding load resistor R8 to dissipate excessive energy on the DC link.

Figure 15:
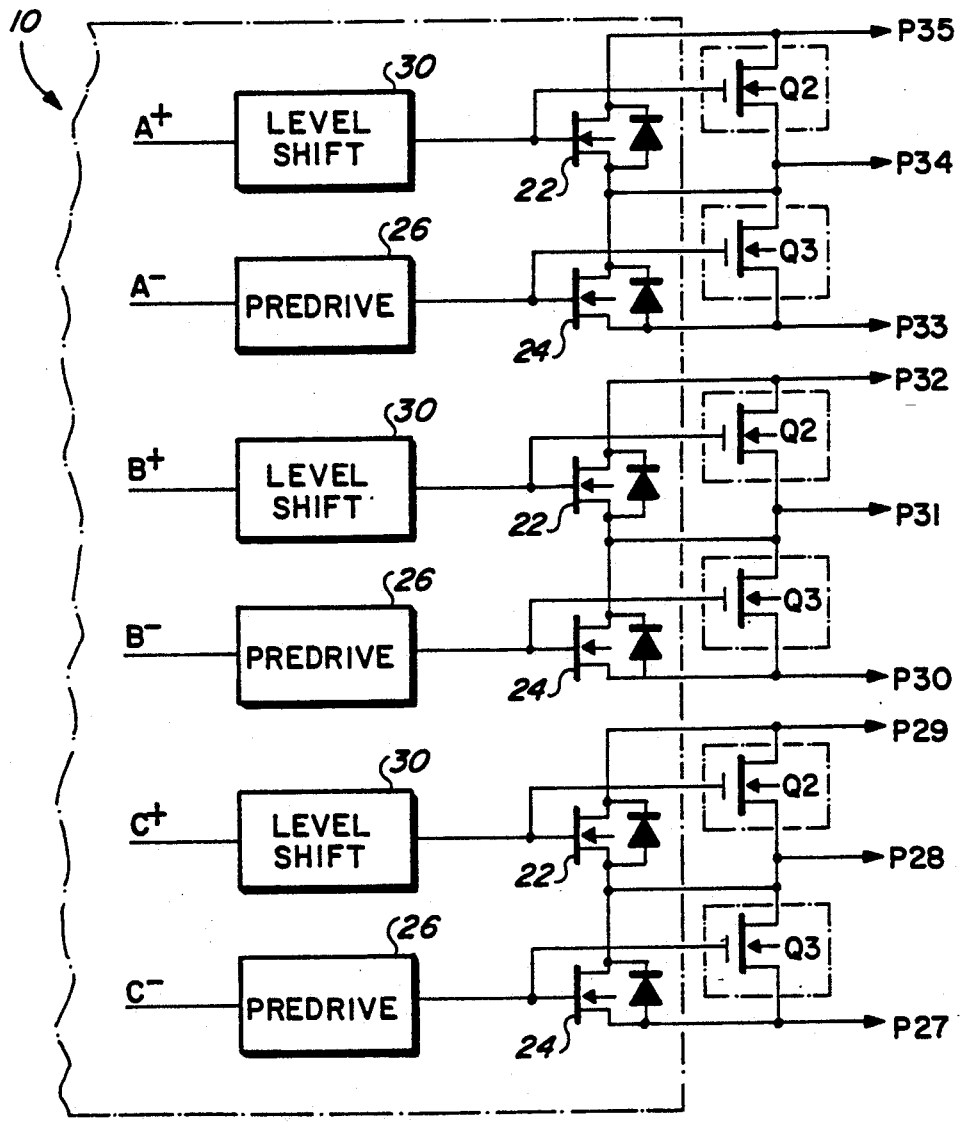
FIG. 15 is a schematic diagram of the chip configured with external power FETS.

FIG. 15 shows a configuration in which the motor 14 ,is driven by upper and lower power FETS Q2 and Q3 that are located off the chip 10. This hybrid configuration is required when the on-chip FETS 22 and 24 are not large enough to drive the motor 14 The commutation commands A+, B+ and C+ are supplied to the three FETS Q2 by the predrive levelshifter stages 30 via three pins on the chip 10. The commutation commands A−, B− and C− are supplied to the three FETS Q3 by the predrive stages 26 via three other pins on the chip 10. The controlled current paths of the FETS Q2 and Q3 are connected in parallel with the controlled current paths of their corresponding FETS 22 and 24.

A person skilled in the art can readily appreciate that the chip 10 is implemented at the transistor level, not at the gate level. The chip 10 can be implemented with DMOS technology in a 24 pin DIP package. This package offers convenient interface with either a microcontroller or discrete elements.

It will be understood that this embodiment is merely exemplary and that a person skilled in the art may make many variations and modifications without departing from the spirit and scope of the invention. All such modifications are intended to be included within the scope of the invention as defined in the appended claims.

I claim:

1. An IC controller chip for a brushless dc motor having a rotor and stator windings, said motor providing position signals that indicate the position of said rotor with respect to said stator windings, said chip comprising:
    commutation means, responsive to said position signals, for generating commutation commands;
    inverter means, responsive to said commutation commands, for supplying power on a DC link to said stator windings of said motor, said inverter means including upper and lower power FETS for said stator windings;
    first interface means for interfacing said commutation commands to gates of said upper power FETS and to pins that can be coupled to gates of off-chip upper power FETS; and
    second interface means for interfacing said commutation commands to gates of said lower power FETS and to pins that can be coupled to gates of off-chip lower power FETS.

2. A chip according to claim 1, wherein said upper power FETS are N-channel devices and wherein said lower power FETS are P-channel devices, whereby said upper and lower FETS corresponding to each winding cooperate in a push-pull arrangement.

3. A chip according to claim 1, wherein said first interface means includes level-shifters and said second interface means includes predrive stages.

4. A chip according to claim 1, further comprising boosting means, responsive to said DC link, for supplying boost voltages to said upper FETS of said inverter means.

5. A chip according to claim 4, wherein said boosting means includes charge pump means for supplying said boost voltages.

6. A chip according to claim 5, wherein said boosting means further includes a charge pump clock for supplying signals to said charge pump means, said signals having frequencies that are proportional to said boost voltages.

7. A chip according to claim 1, wherein said pins are coupled to the gates of said off-chip power FETS, and wherein controlled current paths of said off-chip power FETS are coupled in parallel with controlled current paths of said power FETS of said inverter means.

8. An IC controller chip for a brushless dc motor having a rotor and stator windings, said motor providing position signals that indicate the position of said rotor with respect to said stator windings, said chip comprising:
    commutation means, responsive to said position signals, for generating commutation commands;
    inverter means, responsive to said commutation commands, for supplying power on a DC link to said stator windings of said motor; and 'actuatable means for allowing a load to dissipate energy from said stator windings when energy in said windings exceeds a threshold.

9. An IC controller chip for a brushless dc motor having a rotor and stator windings, said motor providing position signals that indicate the position of said rotor with respect to said stator windings, said chip being supplied with an error signal indicating "on-time" of said motor, said chip comprising:
    converting means for converting said error signal into first and second duty cycle commands;
    commutation means, responsive to said position signals and said duty cycle commands, for generating commutation commands; and
    inverter means, responsive to said commutation commands, for supplying power on a DC link to said stator windings of said motor, wherein said motor is driven when said first and second duty cycle commands are at first and second states, respectively, wherein said motor is braked when said first and second duty cycle commands are at second and first states, respectively, and wherein power is not supplied to said inverter means when said first and second duty cycle commands are at the same state.

10. A chip according to claim 9, wherein said converting means includes:
   clock means for generating clock pulses;
   first latch means for delaying said error signal by at least one block pulse, an output of said first latch means providing a first delayed signal;
   second latch means, responsive to said first latch means, for delaying said first delayed signal by at least one clock pulse, an output of said second latch means providing a second delayed signal;
   NAND means for NAND'ing together said first and second delayed signals, an output of said NAND means providing said first duty cycle command; and
   NOR means for NOR'ing together said first and second delayed signals, and output of said NOR means providing said second duty cycle command.

11. An IC controller chip for a brushless dc motor having a rotor and stator windings, said motor providing position signals that indicate the position of said rotor with respect to said stator windings, said chip comprising commutation means, responsive to said position signals, for generating commutation commands; inverter means, responsive to said commutation command, for supplying power on a DC link to said stator windings of said motor; and direction means of providing a motor direction command in response to motor direction and speed feedback signals supplied to said chip, said direction means including:
   speed detection means, responsive to said motor speed feedback signal, for indicating when motor speed exceeds a threshold;
   storing means for storing said motor direction signal; and
   means, whose output provides said motor direction command, for outputting said stored motor direction signal when said motor speed is greater than said threshold and for outputting said motor direction signal when said motor speed is less than said threshold.

12. An IC controller chip for a brushless dc motor having a rotor and stator windings, said motor including position sensors for providing position signals that indicate the position of said rotor with respect to said stator windings, said chip comprising commutation means, responsive to said position signals, for generating commutation commands; inverter means, responsive to said commutation commands, for supplying power on a DC link to said stator windings of said motor; and disabling means for causing said commutation means to disable said inverter means in the event of motor overcurrent or position sensor failure, said disabling means including:
   position failure means for issuing a failure signal when said position sensors fail;
   delaying means, responsive to said position failures means, for delaying said failure signal; and
   means for causing said commutation means to disable said inverter means when said failure and delayed signals simultaneously indicate position sensor failure.

13. A system for controlling a brushless dc motor having a rotor and stator windings, comprising:
   means for providing position signals that indicate the position of said rotor with respect to said stator windings;
   an IC controller chip including selecting means; commutation means, responsive to said position signals, for generating commutation commands; and inverter means, responsive to said commutation commands, for supplying power on a DC link to said stator windings of said motor, said inverter means including upper and lower power FETS for said stator windings; and
   current feedback means, coupled to said chip, for providing a current feedback signal to said chip, said current feedback means including a load for each winding, each said load being coupled between a dc link return and a corresponding lower power FET; detecting means for detecting voltage drops across each one of said loads, whereby said voltage drops are proportional to currents flowing through said windings; and multiplexer means, responsive to said selecting means, for selecting one of said voltage drops, an output of said multiplexer means providing said current feedback signal.

14. A system according to claim 13, wherein said selecting means selects said voltage drop in response to said position signals and a direction command.

15. An IC controller chip for a brushless dc motor having a rotor and stator windings, said motor providing position signals that indicate the position of said rotor with respect to said stator windings, said chip comprising:
   commutation means, responsive to said position signals, for generating either first or second sets of commutation commands that operate said motor in two or four quadrant operation, wherein said commutation means generates said first set of commutation commands in response to said position signals, a direction signal indicating commanded motor direction, and an error signal indicating on-time of said first set of commutation commands, and wherein said commutation means issues said second set of commutation commands in response to said position signals, a motor direction command, an first and second duty cycle commands indicating on-time of said second set of commutation commands; and
   inverter means, responsive to said commutation commands, for supplying power on a DC link to said stator windings of said motor.

16. A chip according to claim 15, implemented in DMOS technology.

* * * * *